US012312212B2

(12) United States Patent
Mäkimattila et al.

(10) Patent No.: US 12,312,212 B2
(45) Date of Patent: May 27, 2025

(54) ELEVATOR CAR AND CONSTRUCTION-TIME ELEVATOR ARRANGEMENT AND METHOD

(71) Applicant: KONE Corporation, Helsinki (FI)

(72) Inventors: Simo Mäkimattila, Helsinki (FI); Emil Hagström, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1202 days.

(21) Appl. No.: 16/919,652

(22) Filed: Jul. 2, 2020

(65) Prior Publication Data

US 2021/0053798 A1 Feb. 25, 2021

(30) Foreign Application Priority Data

Aug. 21, 2019 (EP) .................................... 19192757

(51) Int. Cl.

*B66B 11/02* (2006.01)
*B66B 1/46* (2006.01)

(52) U.S. Cl.

CPC ............ *B66B 11/022* (2013.01); *B66B 1/468* (2013.01); *B66B 11/0226* (2013.01); *B66B 11/0213* (2013.01); *B66B 2201/306* (2013.01)

(58) Field of Classification Search

CPC ............... B66B 11/022; B66B 11/0213; B66B 11/0226; B66B 1/468; B66B 2201/306; B66B 19/002

See application file for complete search history.

(56) References Cited

U.S. PATENT DOCUMENTS 4,723,627 A * 2/1988 Ito ............................. B66B 9/00 187/401
9,783,391 B2 * 10/2017 Zerelles ................ B66B 11/022
2008/0006485 A1 * 1/2008 Kocher ............... B66B 11/0095 187/382
2017/0240380 A1 * 8/2017 Reuter .................... B66B 5/027
2018/0029832 A1 2/2018 Fargo et al.
2018/0105394 A1 * 4/2018 Hill ..................... B66B 11/0233

(Continued)

FOREIGN PATENT DOCUMENTS

CN 106429753 A * 2/2017
DE 102006023920 A1 * 11/2007 ......... B66B 11/0246
JP H05246662 A * 9/1993

(Continued)

OTHER PUBLICATIONS

Machine translation of JP 2012035922 A. (Year: 2012).*
European Search Report issued in EP 19192757.3, dated Mar. 18, 2020.

*Primary Examiner* — Minh Truong
*Assistant Examiner* — Michelle M Mudwilder
(74) *Attorney, Agent, or Firm* — Birch, Stewart, Kolasch & Birch, LLP

(57) ABSTRACT

An elevator car includes a first floor for delimiting a transport space above it, and a second floor for delimiting a second transport space above it. One of the first and second floors is a displaceable floor, the elevator car being shiftable between a double-decker-state and a single decker-state by displacing the displaceable floor. A construction-time elevator arrangement and a method for elevator use during construction of a building, which implement the elevator car, are also disclosed.

13 Claims, 5 Drawing Sheets

(56) References Cited

U.S. PATENT DOCUMENTS

2020/0277163 A1* 9/2020 Fauconnet ............ B66B 5/0012

FOREIGN PATENT DOCUMENTS

| | | | | | |
|---|---|---|---|---|---|
| JP | H06278973 A | * | 4/1994 | | |
| JP | 10-17228 A | | 1/1998 | | |
| JP | 2000-313578 A | | 11/2000 | | |
| JP | 2007001698 A | * | 1/2007 | | |
| JP | 2007-230668 A | | 9/2007 | | |
| JP | 2011098788 A | * | 5/2011 | | |
| JP | 2012035922 A | * | 2/2012 | | |
| JP | 2012086970 A | * | 5/2012 | | |
| WO | WO-2018071943 A1 | * | 4/2018 | ............. | A47G 29/12 |

* cited by examiner 100
81
80
110
B
R
60
H
71
C,C2,C3,C',C''
70
71

ELEVATOR CAR AND CONSTRUCTION-TIME ELEVATOR ARRANGEMENT AND METHOD

FIELD OF THE INVENTION

The invention relates an elevator car, a construction-time elevator arrangement and a method for elevator use during construction of a building.

BACKGROUND OF THE INVENTION

During construction of a building, people and goods need to move vertically for enabling construction work in the upper parts of the building under construction. For example, construction workers need to move to the floor where their construction site is located, as well as away from that floor. Likewise, goods, such as tools, equipment and construction material need to move to the floor where the construction site of the respective tools, equipment and construction material is located.

In prior art, transportation of goods during construction work of the building has been performed by lifting with a building crane and/or by temporary hoists and/or by a temporary elevator installed outside the building under construction. Typically, particularly heavy and/or large goods have been transported by a crane or by temporary hoists. In prior art, transportation of people has been performed by aid of a temporary elevator installed outside the building under construction or a construction-time elevator installed inside the building, such as a so-called jump elevator. Commonly, separate means have been used for transporting people and goods, because these have had different requirements for the transportation means, in particular with regard to safety, comfort and speed of transportation as well as the size and weight of the objects to be transported. A drawback in use of said known solutions for transporting goods and people has been that they have not been optimized in terms of efficiency of flow of both people and goods. Moreover since various different means of transportation have been used in parallel managing the process and flow of goods and people, as well as ensuring safety in all the related actions, has been complicated. Moreover, use of various different temporary solutions has slowed down transition to serving transportation needs of the final building.

BRIEF DESCRIPTION OF THE INVENTION

The object of the invention is to introduce a new elevator car and an elevator arrangement and a new method, which facilitate safe, convenient and efficient flow of both people and goods to be transported during construction-time of a building.

An object is to introduce a solution by which one or more of the above defined problems of prior art and/or problems discussed or implied elsewhere in the description can be solved.

An object is further to introduce a solution which provides safe, convenient and efficient flow of both people and goods to be transported during construction-time of a building, while at the same time facilitating smooth transition to serving transportation needs of the final building.

It is brought forward a new elevator car comprising a first floor for delimiting a first transport space above it, and a second floor for delimiting a second transport space above it. One of the first and second floor is a displaceable floor, the elevator car being shiftable between a double-decker-state and a single-decker-state by displacing the displaceable floor. With this solution one or more of the above mentioned objects can be achieved. Particularly, this provides that the configuration can be swiftly modified according to needs such that safety, conveniency and efficiency of flow of both people and goods to be transported during construction-time of a building is facilitated. Simple and quick transition to serving needs of the final building, which may be different from those of the building during construction-time thereof, is also facilitated.

Preferable further details are introduced in the following, which further details can be combined with the elevator car individually or in any combination.

In a preferred embodiment, in said double-decker-state, the first and second floor are horizontal and at vertical distance from each other, each said first and second floor having above it a transport space for receiving a load to be transported. Particularly, the first floor has above it a first transport space for receiving a load to be transported, and the second floor has above it a second transport space for receiving a load to be transported.

In a preferred embodiment, in said double-decker-state each said first and second transport space is delimited by a ceiling. The ceiling of the first transport space may be formed by the second floor.

In a preferred embodiment, the first transport space and the second transport space can (or are arranged to) be merged by displacing the displaceable floor such that a higher third transport space, i,e, higher than said first transport space or the second transport space, is formed.

In a preferred embodiment, the elevator car comprises a cabin box comprising a ceiling; and the aforementioned first floor forms the bottom floor of the cabin box; and the aforementioned second floor between first floor and the ceiling separating the interior of the cabin box into two transport spaces, namely a first transport space between the first floor and the second floor and a second transport space between the second floor and the ceiling, which two transport spaces are in particular one above the other, which second floor is mounted displaceably for enabling merging of the first transport space and the second transport space such that a higher third transport space, i,e, higher than said first space or the second transport space, is formed. The height of the third transport space is preferably equal to the aforementioned interior of the cabin box. Thus, suitability of the car to transport different loads can be changed according to the requirements set by the loads to be transported.

In a preferred embodiment, the displaceable floor is displaceable by pivoting, in particular between a horizontal position and an upright or at least a substantially upright position.

In a preferred embodiment, the displaceable floor is pivotally mounted on the cabin box.

In a preferred embodiment, the displaceable floor is displaceable by detaching it from the elevator car.

In a preferred embodiment, the elevator car comprises a frame carrying the cabin box, a suspension roping for suspending the car preferably being fixable on the frame.

In a preferred embodiment, the cabin box is self-bearing, a suspension roping for suspending the car preferably being fixable on the cabin box.

In a preferred embodiment, the elevator car comprises a first frame carrying the first floor and a second frame carrying the second floor, said first and second frame being detachably fixed together, said displaceable floor being displaceable by detaching the first frame from the second frame. Preferably, a suspension roping for suspending the car is fixable/fixed on the second frame. Preferably, a first cabin box is carried by the first frame and comprising said first floor and a second cabin box is carried by the second frame and comprising said second floor.

In a preferred embodiment, the first frame and the second frame are fixed together by releasable fixing means.

In a preferred embodiment, the elevator car comprises at least one guide, such as roller guide or sliding guide, for guiding the movement of the car along at least one rail line installed in a hoistway.

In a preferred embodiment, the cabin box is telescopically extendable in vertical direction for increasing height thereof, and in particular the interior of the thereof.

In a preferred embodiment, the frame is telescopically extendable in vertical direction for increasing the height of the frame.

In a preferred embodiment, the first and/or the second transport space is delimited by floor, walls, ceiling and a door.

In a preferred embodiment, the door delimiting the first and/or the second second transport space is an automatic door. This provides high degree of conveniency for passenger use already during construction time, while also facilitating efficiency and safety of operation.

It is also brought forward a new construction-time elevator arrangement, comprising a hoistway inside a building under construction, and an elevator car as defined anywhere above or in the claims of the application, which elevator car is arranged to be vertically movable in the hoistway. With this solution one or more of the above mentioned objects can be achieved. Particularly, this provides that the configuration can be swiftly modified according to needs such that safety, conveniency and efficiency of flow of both people and goods to be transported during construction-time of a building is facilitated. Simple and quick transition to serving needs of the final building, which may be different from those of the building during construction-time thereof, is also facilitated.

Preferable further details have been introduced in the above and in the following, which further details can be combined with the arrangement individually or in any combination.

In a preferred embodiment, the construction-time elevator arrangement comprises at least one rail line installed in a hoistway along which the car is movable.

In a preferred embodiment, the elevator car comprises at least one guide, such as roller guide or sliding guide arranged to guide the movement of the car along at least one rail line installed in a hoistway.

In a preferred embodiment, the construction-time elevator arrangement comprises a machinery and an elevator control system.

In a preferred embodiment, the elevator car comprises a frame carrying the cabin box, and preferably a suspension roping for suspending the car fixed on the frame.

In a preferred embodiment, the cabin box is self-bearing, and a suspension roping for suspending the car preferably being fixed on the cabin box.

In a preferred embodiment, the construction-time elevator arrangement, in particular an elevator control system thereof, is configured, in particular by operating a machinery, to automatically move the elevator car between vertically displaced landings in response to signals received from one or more user interfaces, such as one or more user interfaces operable by a user, particularly a passenger.

In a preferred embodiment, the user interface is provided by a user interface device, such as a panel for instance, mounted stationary at a landing or a portable communication device, such as a mobile phone or a tablet.

In a preferred embodiment, the user interface can comprise operating means, such as a touch screen or buttons, for instance.

In a preferred embodiment, the machinery comprises a motor and a drive sheave rotatable by the motor, the drive sheave engaging a roping connected with the car, an elevator control system being configured to control rotation of the motor.

It is also brought forward a new method for elevator use during construction of a building comprising using an elevator car or a construction-time elevator arrangement as defined anywhere above or in the claims of the application for transporting passengers and goods vertically in a building under construction. With this solution one or more of the above mentioned objects can be achieved. Particularly, this provides that the configuration can be swiftly modified according to needs such that safety, convenience and efficiency of flow of both people and goods to be transported during construction-time of a building is facilitated. Simple and quick transition to serving needs of the final building, which may be different from those of the building during construction-time thereof, is also facilitated.

Preferable further details have been introduced in the above and in the following, which further details can be combined with the method individually or in any combination.

In a preferred embodiment, the method comprises transporting passengers in the first transport space and goods in a second transport space while the car is in the double-decker-state.

In a preferred embodiment, the method comprises shifting the elevator car between a double-decker-state and a single-decker-state by displacing the displaceable floor.

In a preferred embodiment, the shifting comprises merging of the first transport space and the second transport space by displacing the displaceable floor such that one higher third transport space, preferably the height of which is equal or at least substantially equal to the aforementioned interior of the cabin box, is formed.

In a preferred embodiment, the displacing the displaceable floor comprises pivoting it from a horizontal position to an upright or at least a substantially upright position.

In a preferred embodiment, the method comprises after merging of the first transport space and the second transport space, loading a load to be transported the length of which exceeds the height of the first and second transport space. Moreover, at a suitable moment after said merging, the method comprises returning the car back to the double decker state, whereby the use of the elevator car can be continued in double decker state.

In a preferred embodiment, the displacing the displaceable floor comprises detaching it from the elevator car. The detachability is preferably provided such that the elevator car comprises a first frame carrying the first floor and a second frame carrying the second floor, said first and second frame being detachably fixed together, and said detaching comprises detaching the first frame from the second frame.

In a preferred embodiment, the detaching comprises removing the displaceable floor from the hoistway.

In a preferred embodiment, the method comprises removing the car from transport use, and thereafter increasing the traveling zone of the car of the car to reach higher and thereafter taking the car back to transport use.

In a preferred embodiment, the method comprises subsequent to using the elevator car for transporting passengers and goods vertically in a building under construction a period of time, constructing a second elevator car in place of the elevator car. Said constructing preferably comprises arranging the second elevator car to be vertically movable along at least one guide rail line of the elevator car. Thus, transformation of the elevator to form a second passenger elevator in its place is performed utilizing components already present, which facilitates swiftness and economy of the transformation. This facilitates smooth transition to serving transportation needs of the final building. Preferably, one or more components comprised in the elevator car, such as one or more of a car frame, guide members, such as roller guides or slide guides, a transport platform, are utilized in the constructing the second passenger elevator car in place of the elevator car. In this case, preferably said constructing a second elevator car in place of the elevator car is performed such that one or more of a car frame, guide members, such as roller guides or slide guides, a transport platform form corresponding part(s) of the second elevator car. Thus, transformation to serving transportation needs of the final building is performed utilizing components of the construction-time elevator, which facilitates swiftness and economy of the transformation.

In a preferred embodiment, the building under construction is preferably such that it has not reached its final height yet, the upper parts thereof still being missing. Hereby, preferably during the method, the building under construction is constructed to be higher, most preferably during the method new floors are constructed on existing floors of the building under construction.

In a preferred embodiment, each said elevator hoistway is a space inside the building under construction wherein an elevator car can move vertically.

In a preferred embodiment, each said elevator hoistway is delimited by one or more inner walls of the building, said walls preferably being concrete walls.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
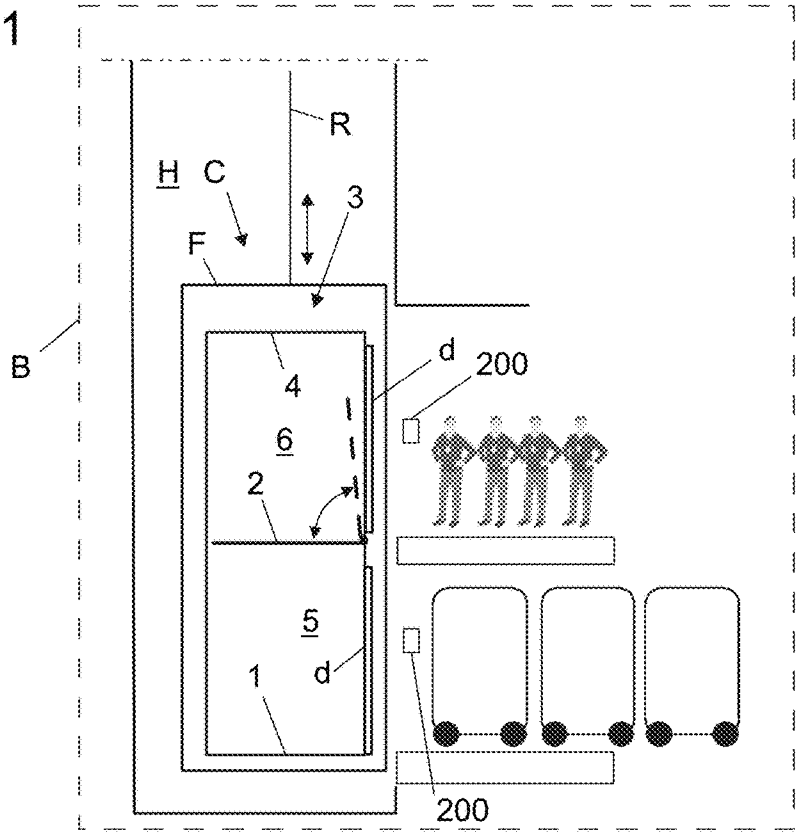
FIG. 1 illustrates a construction-time elevator arrangement according to a first embodiment, the arrangement comprising an elevator car according to a first embodiment as provided at a phase of a method according to a first embodiment.
Figure 2:
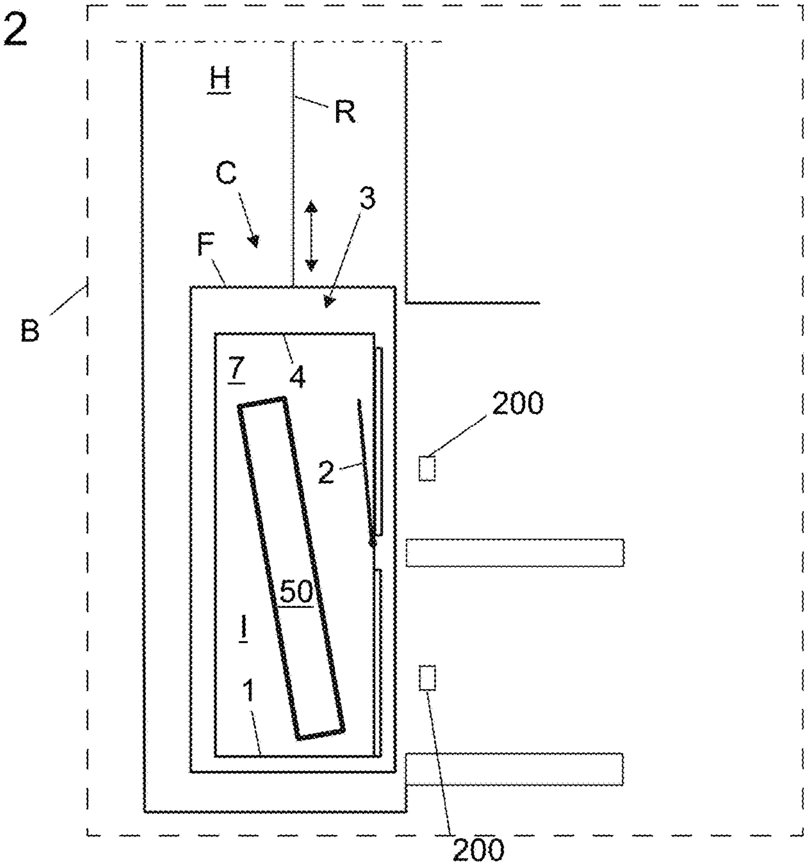
FIG. 2 illustrates the elevator car and elevator arrangement of FIG. 1 at a subsequent phase of the method according to the first embodiment.
Figure 3:
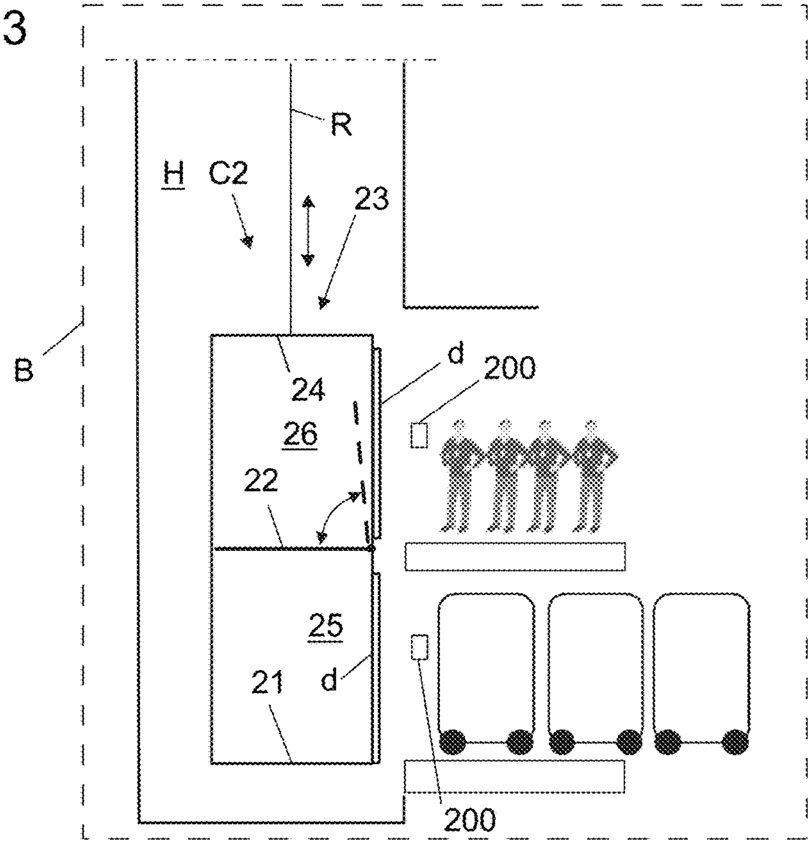
FIG. 3 illustrates a construction-time elevator arrangement according to a second embodiment, the arrangement comprising an elevator car according to a second embodiment as provided at a phase of a method according to a second embodiment.

In the embodiments of FIGS. 1 and 3, the elevator car C;C2 comprises a first floor 1; 21 for delimiting a first transport space 5;25 above it, and a second floor 2,22 for delimiting a second transport space 6,26 above it. One of the first and second floor 1,2;21,22, in particular the second floor 2;22, is a displaceable floor, and the elevator car C,C2 is shiftable between a double-decker state and a single decker-state by displacing the displaceable floor 2;22. In FIGS. 1 and 3 the car C;C2 is in the double-decker state and in FIGS. 2 and 4 the car C;C2 is in the single-decker state.

In the embodiments of FIGS. 1 and 3, the first transport space 5;25 and the second transport space 6;26 can be merged by displacing the displaceable floor 2;22 such that a higher third transport space 7;27, i,e, higher than said first transport space 5;25 or the second transport space 6;26, is formed. Thus, suitability of the car C;C2 to transport different loads can be changed according to the requirements set by the loads. For example, two transport spaces 5,6;25,26 are efficient when at the same time passengers and goods are to be transported separately from each other, which is both safe and convenient for the passengers. On the other hand, a single higher space is efficient when an exceptionally tall object 50 is to be transported, such as an object the height of which exceeds the height of the first or second transport space 1,2;21,22. This is the case for example when a tall panel element or a glass element intended to be installed is to be transported from one landing to another in a building B under construction.

In said double-decker state of the car C;C2, as illustrated in FIGS. 1 and 3, the first and second floor 1,2; 21,22 are horizontal and at vertical distance from each other, each said first and second floor 1,2;21,22 having above it a transport space 5, 6;25,26 for receiving a load to be transported. Particularly, the first floor 1;21 has above it a first transport space 5;25 for receiving a load to be transported, and the second floor 2;22 has above it a second transport space 6;26 for receiving a load to be transported. Moreover, in said double-decker state each said first and second transport space 5,6;25,26 is delimited by a ceiling 2,4;22,24. The ceiling of the first transport space is formed by the second floor 2;22.

In said single-decker state of the car C, as illustrated in FIG. 2, the displaceable floor 2 has been displaced such that it is not anymore positioned horizontal at vertical distance from the first floor having above it a second transport space for receiving a load to be transported.

In the embodiments of FIGS. 1 and 3, the elevator car C;C2 is particularly moreover such that it comprises a cabin box 3;23 comprising a ceiling 4;24; and the aforementioned first floor 1;21 forms the bottom floor of the cabin box 3;23; and the aforementioned second floor 2;22 between first floor 1;21 and the ceiling 4;24 separates the interior of the cabin box 3;23 into two transport spaces, namely a first transport space 5;25 between the first floor and the second floor 2;22 and a second transport space 6;26 between the second floor 2;22 and the ceiling 3;23, which two transport spaces 5,6;25,26 are one above the other, which second floor 2;22 is mounted displaceably for enabling merging of the first transport space and the second transport space such that a higher third transport space 7;27, i,e, higher than said first and second transport space 5,6;25,26, in particular equal or at least substantially equal to the aforementioned interior of the cabin box 3;23, is formed.

Figure 4:
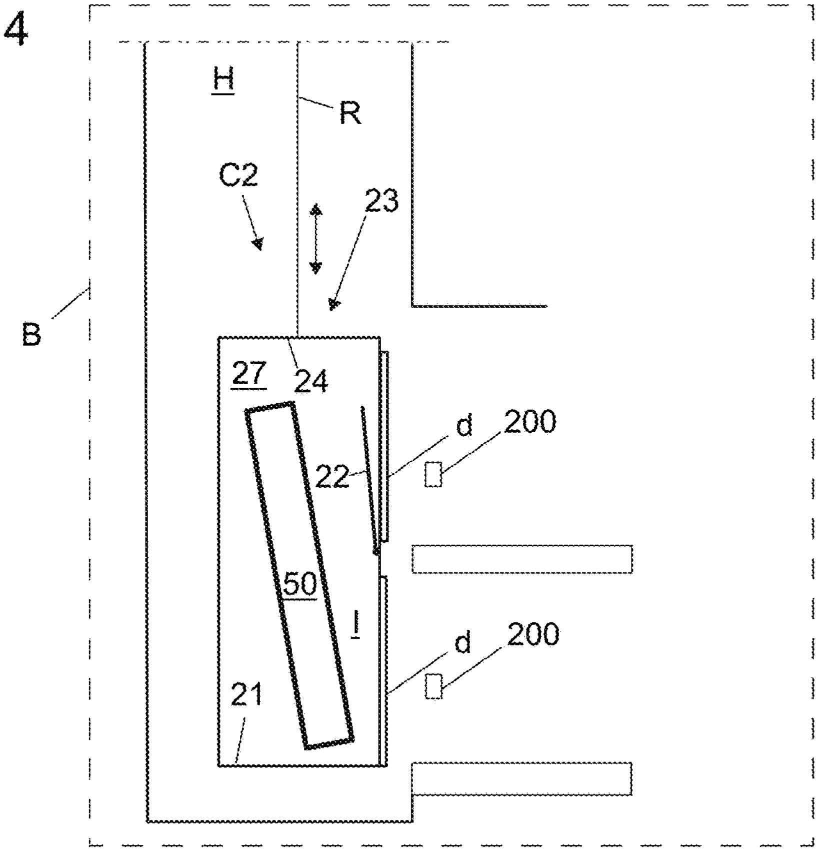
FIG. 4 illustrates the elevator car and elevator arrangement of FIG. 3 at a subsequent phase of the method according to the second embodiment.

In the embodiments of FIGS. 1 and 3, the elevator car C;C2 is particularly moreover such that the displaceable floor 2,22 is displaceable by pivoting between a horizontal position and an upright or at least a substantially upright position, to be positioned as illustrated in FIGS. 2 and 4. The displaceable floor 2,22 is pivotally mounted on the cabin box 3,23, whereby its position can be changed easily.

The embodiments of FIGS. 1 and 3 differ from each other in the bearing structures of the car C. In the embodiment of FIG. 1, the elevator car C comprises a frame F (meaning a structure in some occasions also known by term "sling") carrying the cabin box 3, and a suspension roping R for suspending the car C is fixed on the frame F. In the embodiment of FIG. 1, the cabin box 23 is self-bearing, and the elevator car C comprises a suspension roping R for suspending the car C2 fixed on the cabin box 23.

Figure 5:
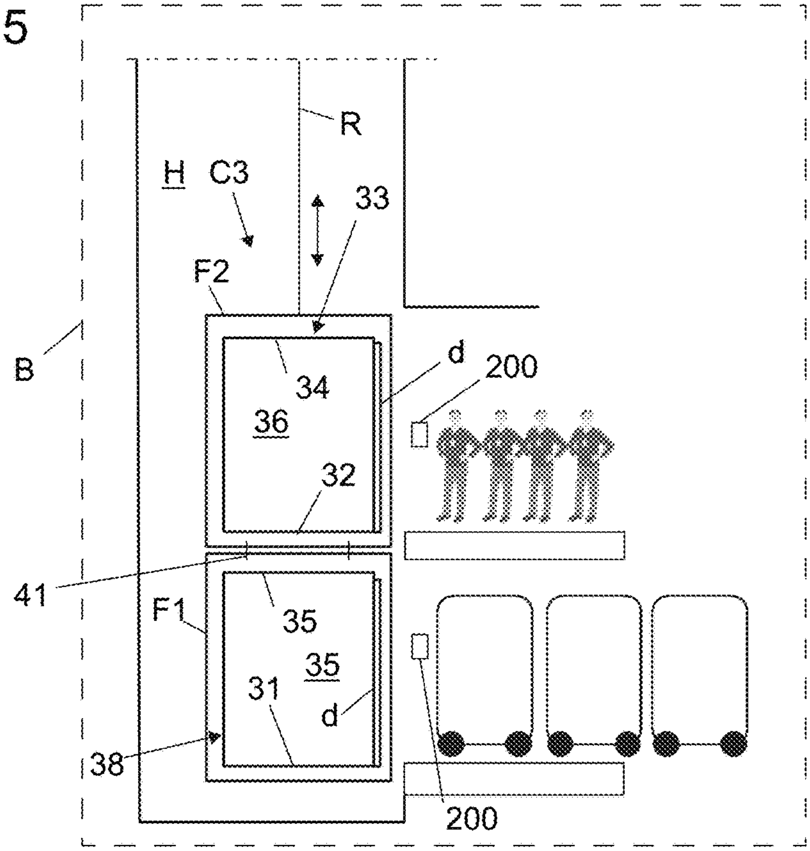
FIG. 5 illustrates a construction-time elevator arrangement according to a third embodiment, the arrangement comprising an elevator car according to a third embodiment as provided at a phase of a method according to a third embodiment.

In the embodiment of FIG. 5, the elevator car C3 comprises a first floor 31 for delimiting a transport space 35 above it, and a second floor 32 for delimiting a second transport space 36 above it. One of the first and second floor 31,32, in particular the second floor 32, is a displaceable floor, and the elevator car C3 is shiftable between a double-decker state and a single decker-state by displacing the displaceable floor 32. In FIG. 5 the car C3 is in the double-decker state and in FIG. 6 the car C3 is in the single-decker state.

In the embodiment of FIG. 5, the displaceable floor 32 is displaceable by detaching it from the elevator car C3. This provides a way to modify the transport capacity of the car C3 in terms of floor area, floor number and total space. This is advantageous particularly when during construction-time there is a need for separating transportation of passengers and goods since in this way, instead of transporting passengers and goods by separate means or in separate runs, hereby passengers and goods can be transported separately from each other at the same time by same transportation means, which is both safe and convenient for the passengers. On the other hand, the elevator car C3 is modifiable to a single-decker to serve well also when ability to transport goods is no longer a priority as much as during construction time.

In said double-decker state of the car C3, as illustrated in FIG. 5, the first and second floor 31,32 are horizontal and at vertical distance from each other, each said first and second floor 31,32 having above it a transport space 35,36 for receiving a load to be transported. Particularly, the first floor 31 has above it a first transport space 35 for receiving a load to be transported, and the second floor 32 has above it a second transport space 36 for receiving a load to be transported. Moreover, in said double-decker state each said first and second transport space 36 is delimited by a ceiling 34.

The detachability of the displaceable floor 31 is implemented such that the elevator car C3 comprises a first frame F1 (meaning a structure in some occasions also known by term "sling") carrying the first floor 31 and a second frame F2 carrying the second floor 32, said first and second frame F1,F2 being detachably fixed together, said displaceable floor thus being displaceable from the elevator car C3 by detaching the first frame F1 from the second frame F2. The elevator car C3 more specifically comprises a first cabin box 38 carried by the first frame F1 and comprising said first floor 31 and a second cabin box 33 carried by the second frame F2 and comprising said second floor 32. The cabin boxes 33,38 are on top of each other such that the first and second transport space 35,36 are one above the other. By detaching the first frame F1 carrying the first cabin box 38 from the second frame F2 the first floor 31 comprised in the first cabin box 38 is detachable from the car C3.

Preferably, the first frame and the second frame are fixed together by releasable fixing means 41.

Figure 6:
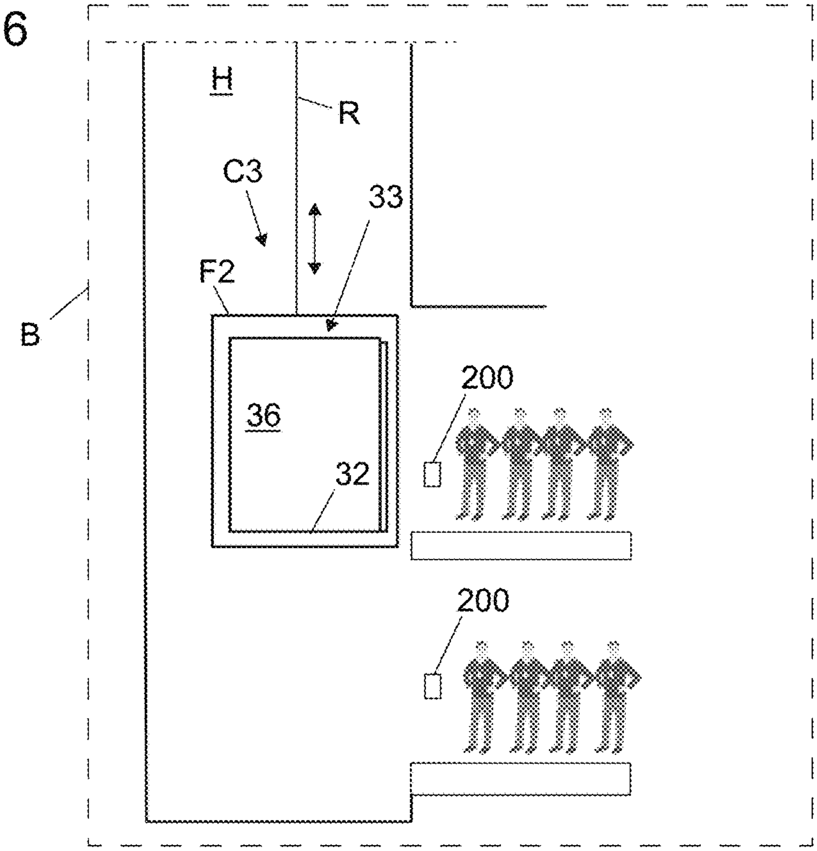
FIG. 6 illustrates the elevator car and elevator arrangement of FIG. 5 at a subsequent phase of the method according to the third embodiment.

In said single-decker state of the car C3, as illustrated in FIG. 6, the displaceable floor 32, along with the first frame F1 and the rest of the first cabin 38, has been detached from the car C3 such that the displaceable floor 31 is not positioned horizontal at vertical distance from the second floor 32 having above it a second transport space for receiving a load to be transported.

In the embodiment of FIGS. 5 and 6, a suspension roping R for suspending the car C3 is fixed on the second frame F2.

Figure 7:
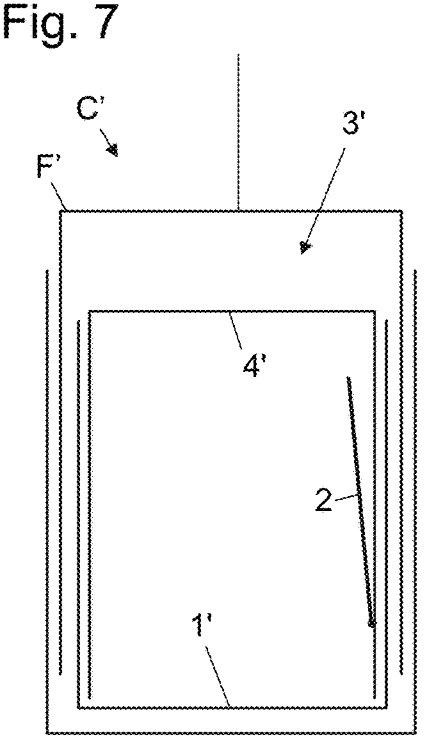
FIGS. 7 and 8 illustrates an alternative for the structure of the car of FIGS. 1 and 2 in two different states.
Figure 8:
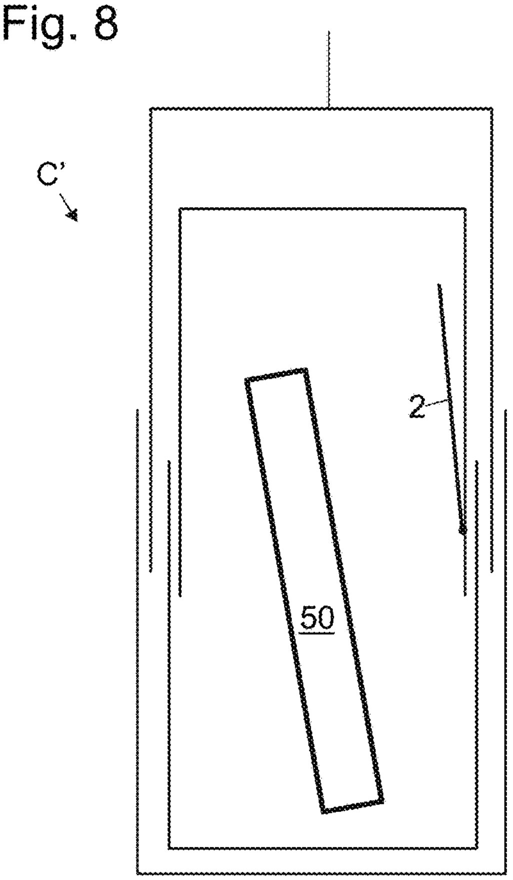

FIGS. 7 and 8 illustrate an alternative for the structure of the car C of FIGS. 1 and 2. In this case, the car C' is otherwise similar as described referring to FIGS. 1 and 2, but the frame F' and the cabin box 3' are telescopically extendable in vertical direction for increasing their height. Thus, the car be shifted into a single decker state where said parts of the car C' have a reduced height, as illustrated in FIG. 7, or into a single decker state where said parts of the car C' have an extended height, as illustrated in FIG. 8, or into a double decker state where said parts of the car C' have a an extended height as illustrated in FIG. 8, and moreover the displaceable floor 2 has been placed to be horizontal and at vertical distance above the first floor 1', such that each said first floor 1' and second floor 2 have above it a transport space for receiving a load to be transported, which placing can be in the presented case be performed by pivoting the displaceable floor 2.

Figure 9:
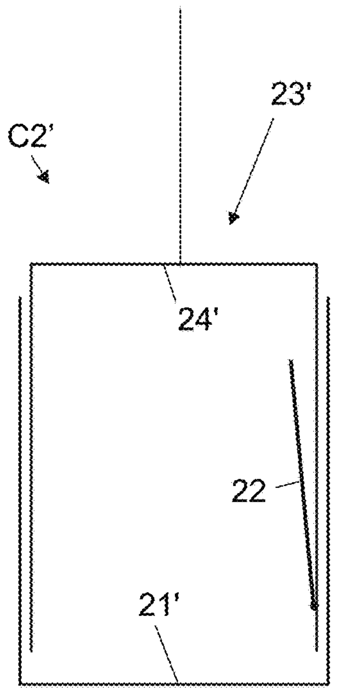
FIGS. 9 and 10 illustrates an alternative for the structure of the car of FIGS. 3 and 4 in two different states.
Figure 10:
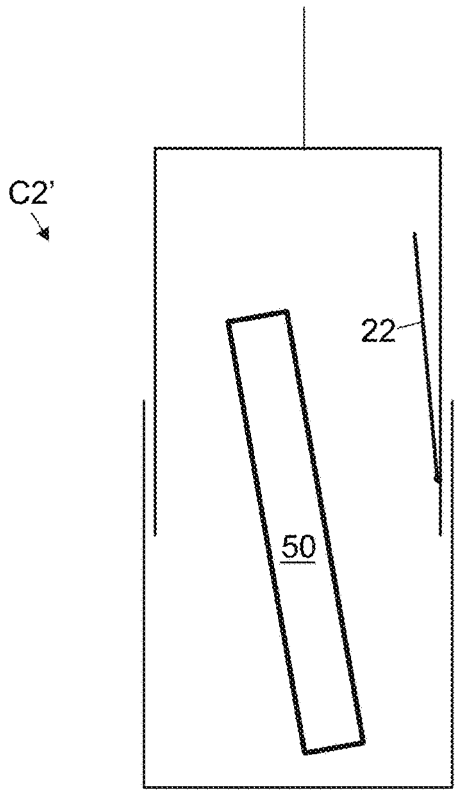

FIGS. 9 and 10 illustrate an alternative for the structure of the car C of FIGS. 3 and 4. In this case, the car C2' is otherwise similar as described referring to FIGS. 3 and 4, but the self-bearing cabin box 23' is telescopically extendable in vertical direction for increasing its height. Thus, the car C2' can be shifted into a single decker state where the cabin box 23' of the car C2' has a reduced height, as illustrated in FIG. 9, or into a single decker state where the cabin box 23' of the car C2' has an extended height, as illustrated in FIG. 10, or into a double decker state where the cabin box 23' of the car C2' has a an extended height as illustrated in FIG. 10, and moreover the displaceable floor 2 has been placed to be horizontal and at vertical distance above the first floor 21', such that each said first floor 21' and second floor 22 have above it a transport space for receiving a load to be transported, which placing can be in the presented case be performed by pivoting the displaceable floor 22.

Figure 11:
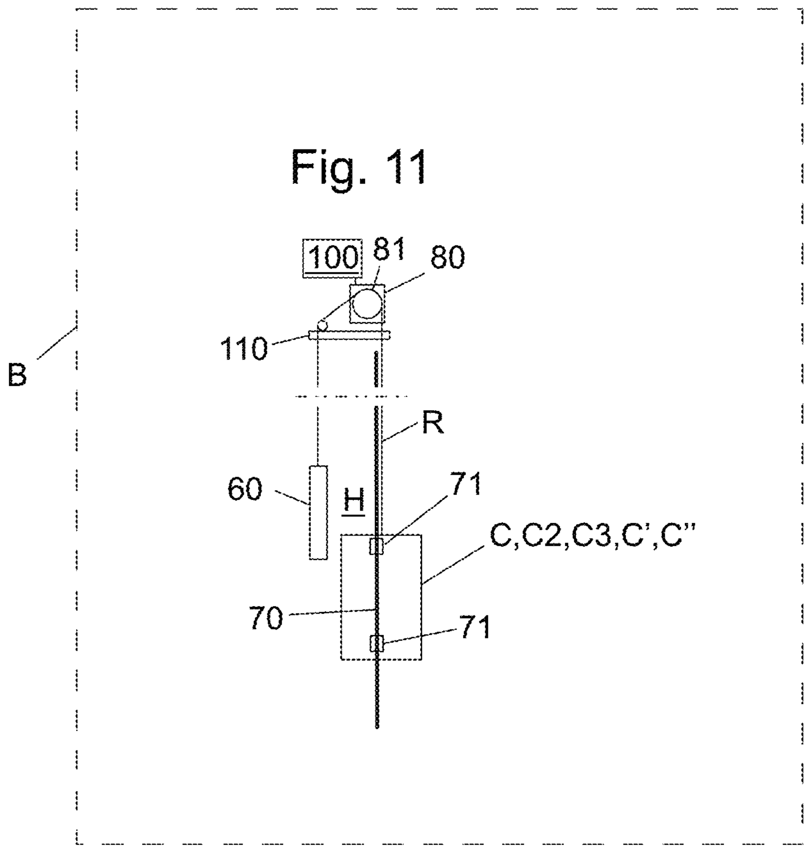
FIG. 11 illustrates preferred further details of the elevator car and the construction-time elevator arrangement and the method.

FIG. 11 illustrates preferred, yet optional, further features of the elevator car C,C2,C3,C',C" and the construction-time elevator arrangement. In this case, the elevator car C,C2, C3,C',C" comprises at least one guide 71, such as roller guide or sliding guide, for guiding the movement of the car C,C2,C3,C',C" along at least one rail line 70 installed in a hoistway. The construction-time elevator arrangement is such that it comprises a hoistway H inside a building B under construction, and the elevator car C,C2,C3,C',C" is arranged to be vertically movable in the hoistway H. The construction-time elevator arrangement moreover comprises a counterweight 60 and a suspension roping connected with the car C,C2,C3,C',C" and the counterweight 60.

The construction-time elevator arrangement moreover comprises a machinery 80,81 and an elevator control system 100. The machinery 80,81 comprises a motor 80 and a drive sheave 81 rotatable by the motor 80 the drive sheave 81 engaging a suspenion roping R connected with the car C,C2,C3,C',C", the elevator control system 100 being configured to control rotation of the motor.

The construction-time elevator arrangement, in particular the elevator control system 100 thereof, is configured, in particular by operating the machinery 80,81, to automatically move the elevator car C,C2,C3,C',C" between vertically displaced landings in response to signals received from one or more user interfaces, such as one or more user interfaces 200 as illustrated in FIGS. 1-6, operable by a user. The one or more user interfaces 200 preferably comprise each a touch screen or buttons.

Generally, it is preferred, although not necessary, that the first and/or the second transport space is delimited by floor, walls, ceiling and a door d as illustrated in FIGS. 1-6. The door d delimiting the first and/or the second second transport space is preferably an automatic door. The door d being an automatic door makes the car well suitable for efficiently, conveniently and safely serving of passengers already during construction-time of a building B, in particular for ensuring swift closing and opening doorway of the elevator car. Opening and closing movement of said automatic door d is preferably automatically controlled by the aforementioned elevator control system 100.

FIGS. 1 and 2, FIGS. 3 and 4, and FIGS. 5 and 6 illustrate subsequent phases of the methods according to the first, second and third embodiment, respectively. In each case, the method for elevator use during construction of a building comprising using an elevator car C,C2,C3 or a construction-time elevator arrangement as illustrated in FIGS. 1, 3 and 5, respectively, for transporting passengers and goods vertically in a building B under construction. In said transporting passengers are transported in the first transport space 5;25; 35 and goods in a second transport space 6;26;36 while the car C,C2,C3 is in double decker state. After this, the method comprises shifting the elevator car C,C2,C3 from a double-decker state to a single decker-state by displacing the displaceable floor 2;22;32.

In the first and second embodiments, the shifting comprises merging of the first transport space and the second transport space by displacing the displaceable floor 2;22 such that one higher third transport space 7;27, in particular equal or at least substantially equal to the aforementioned interior of the cabin box 3;23, is formed.

In the first and second embodiments, as illustrated in FIGS. 2 and 4, the displacing the displaceable floor 2;22 comprises pivoting it from a horizontal position to an upright or at least a substantially upright position.

Preferably, although not necessarily, the displaceable floor 2;22 is disposed such that the when it is in said upright or at least a substantially upright position, it covers a doorway of the elevator car C,C2,C'C2', in particular such that it blocks passage through the doorway in question, the doorway preferably being the doorway leading to the second transport space 6;26 when the displaceable floor 2;22 is in horizontal position. Thus, when the car C,C2,C'C2' is in its single-decker-state and contains a large object 50, number of doorways is reduced, and unauthorized and unsafe entering the car C,C2,C'C2' is blocked through the doorway in question.

When the displaceable floor 2,22 is displaceable by pivoting, covering the aforementioned doorway leading to the second transport space 6;26 when the displaceable floor 2;22 is in horizontal position is preferably arranged such that in said pivoting from the horizontal position towards the upright or at least a substantially upright position one end of the displaceable floor 2;22 pivots upwards.

The method comprises after said merging of the first transport space and the second transport space, loading a load to be transported the length of which exceeds the height of the first transport space 2;22 and second transport space 6;26.

Moreover, at a suitable moment after said merging, the method comprises returning the car C,C2 back to the double decker state, whereby the use of the elevator car can be continued in double decker state.

In the third embodiment, the shifting comprises the shifting, and in particular the displacing the displaceable floor 32 thereof, comprises is displacing it by detaching it from the elevator car C3. This provides a way to modify the transport capacity of the car C3 in terms of floor area, floor number and total space. This is advantageous particularly when during construction-time there is a need for separating transportation of passengers and goods since in this way, instead of transporting passengers and goods by separate means or in separate runs, hereby passengers and goods can be transported separately from each other at the same time by same transportation means, which is both safe and convenient for the passengers. On the other hand, the elevator car C3 is modifiable to a single-decker to serve well also when ability to transport goods is no longer a priority as much as during construction time.

The detachability is preferably provided such that the elevator car C3 comprises a first frame 33 carrying the first floor 31 and a second frame 34 carrying the second floor 32, said first and second frame 33,34 being detachably fixed together, and said shifting comprises detaching the first frame F1 from the second frame F2.

The detaching preferably comprises removing the displaceable floor 32 from the hoistway H. In the presented embodiment, the first frame F1 is also removed from the hoistway H.

The construction-time elevator arrangement as described anywhere above can be, although this is not necessary, a so called jump-lift arrangement and the method for elevator use during construction of a building can concern a jump-lift arrangement. In this case, the arrangement is provided such that the traveling zone of the elevator car can be increased to reach higher in the hoistway. In this case, the method preferably comprises removing the car C,C2,C3,C',C" from transport use, and thereafter increasing the traveling zone of the car C,C2,C3,C',C" to reach higher and thereafter taking the car C,C2,C3,C',C" back to transport use.

The jumping ability can be implemented by utilizing technology of known "jump-lifts", for example. Then it is preferable to utilize in the method a movable support structure for supporting the car C,C2,C3,C',C", which support structure 110 is mounted in the hoistway H such that can be dismounted and lifted to a higher position in the hoistway H and mounted there stationary. The support structure 110 can support the car by supporting the suspension roping R via the machinery 80,81 of the elevator, as illustrated in FIG. 11, for example. Additional length of roping R is preferably stored in a rope supply storage (not showed), such as one or more rope reels, wherefrom it can be supplied via a releasable rope clamp (not showed). There are also other kind of elevators the traveling height of which can be extended, where one or more of the above described features of a "jump lift" may be unnecessary due to different type of solution.

As mentioned, the displaceable floor is displaceable by pivoting between a horizontal position and an upright or at least a substantially upright position. However, displacing could alternatively be arranged differently, for example by detaching it from the elevator car, possibly to be returned to its position later.

Generally, in the Figures, the frame F,F1,F2,F' has been illustrated schematically. It is preferable that it is positioned and shaped such that the guides and the guide rail lines can be positioned such that passage into the car, or operation of doors when those are present, are not blocked by the guide rail line(s).

Preferably, the method comprises subsequent to using the elevator car C,C2,C3,C',C" for transporting passengers and goods vertically in a building B under construction a period of time, constructing a second elevator car in place of the elevator car C,C2,C3,C',C". Said constructing preferably comprises arranging the second elevator car to be vertically movable along at least one guide rail line 70 of the elevator car C,C2,C3,C',C". Thus, transformation of the elevator to form a second passenger elevator in its place is performed utilizing components already present, which facilitates swiftness and economy of the transformation. This facilitates smooth transition to serving transportation needs of the final building. Preferably, although not necessarily, one or more components comprised in the elevator car C,C2,C3, C',C", such as one or more of a car frame, guide members, such as roller guides or slide guides, a transport platform, are utilized in the constructing the second passenger elevator car in place of the elevator car. In this case, preferably said constructing a second elevator car in place of the elevator car C,C2,C3,C',C" is performed such that one or more of a car frame, guide members, such as roller guides or slide guides, a transport platform form corresponding part(s) of the second elevator car. Thus, transformation to serving transportation needs of the final building is performed utilizing components of the construction-time elevator, which facilitates swiftness and economy of the transformation. Use of components comprised in the elevator car C,C2,C3,C',C" in the constructing of the second elevator car is not necessary, since alternatively, an entirely new second elevator car can be constructed in place of the elevator car C,C2,C3,C',C".

Generally, in the method, the machinery 80,81 of the elevator as illustrated in FIG. 11 can be left in place to serve also in the final building. However, in some cases it may be preferable to replace it at the end of the construction phase of the building B with a second machinery. In this way, the machinery 80,81 used during construction-time may for instance be optimized for construction-time use. For example, it may be oversized such that it can be used to move the elevator car C,C2,C3,C',C" of a building B under construction also when it is loaded exceptionally heavy, such as heavier than nominal load of the elevator when converted to serve in the final building.

It is possible, although not necessary, that the elevator car C,C2,C3,C',C" is provided with a safety structure (not showed) bordering a safety space, e.g. placed on the first floor 1,21,31,2',21', for accommodating a person, such as an operator of the elevator car, which safety structure is then preferably a cage or equivalent. Thus, a person, such as an operator of the elevator car can safely dwell inside the car also when the car transports possibly dangerous goods, such as a large object 50 as illustrated in FIG. 2, 4, 8 or 10.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator car comprising:

a ceiling;

a first floor for delimiting a first transport space above the first floor;

a plurality of sidewalls, each sidewall extending from the first floor to the ceiling; and a second floor for delimiting a second transport space above the second floor, the second floor being between the first floor and the ceiling and extending from a first side wall to a second side wall of the plurality of sidewalls, wherein the second floor is a displaceable floor, the elevator car being shiftable between a double-decker-state and a single-decker-state by displacing the displaceable floor, wherein the displaceable floor is displaceable by pivoting between a horizontal position and an upright or at least a substantially upright position, the displaceable floor extending into the second transport space when in the upright position, wherein displacing the second floor enables merging of the first transport space and the second transport space such that a third transport space is formed, the third transport space extending from the first floor to the ceiling, and wherein a size of the first floor is substantially equal to a size of the second floor.

2. The elevator car according to claim 1, wherein in said double-decker-state, the first floor and the second floor are horizontal and at a vertical distance from each other, each said first floor and said second floor having there above the first transport space and the second transport space, respectively, for receiving a load to be transported.

3. The elevator car according to claim 2, wherein the displaceable floor is hinged to the first sidewall.

4. The elevator car according to claim 1, wherein the elevator car comprises a cabin box comprising a ceiling, wherein the first floor forms a bottom floor of the cabin box, wherein the second floor separates an interior of the cabin box into two transport spaces, the two transport spaces being one above the other.

5. The elevator car according to claim 4, wherein the elevator car comprises a frame carrying the cabin box or the cabin box is self-bearing.

6. The elevator car according to claim 1, wherein the elevator car comprises at least one guide for guiding the movement of the car along at least one rail line installed in a hoistway.

7. A construction-time elevator arrangement, comprising:

a hoistway inside a building under construction; and the elevator car according to claim 1 arranged to be vertically movable in the hoistway.

8. The construction-time elevator arrangement, according to claim 7, wherein the construction-time elevator arrangement is configured to automatically move the elevator car between vertically displaced landings in response to signals received from one or more user interfaces.

9. A method for elevator use during construction of a building comprising using the elevator car according to claim 1 for transporting passengers and goods vertically in the building under construction.

10. The method according to claim 9, comprising transporting passengers in the first transport space and goods in the second transport space while the car is in the double-decker-state.

11. The method according to claim 9, comprising shifting the elevator car between the double-decker-state and the single-decker-state by displacing the displaceable floor.

12. The method according to claim 11, wherein the shifting comprises merging of the first transport space and the second transport space by displacing the displaceable floor such that the third transport space is formed.

13. The method according to claim 12, wherein after said merging, the method comprises returning the elevator car back to the double-decker-state, whereby the use of the elevator car can be continued in the double-decker-state.

* * * * *